Figure 5:
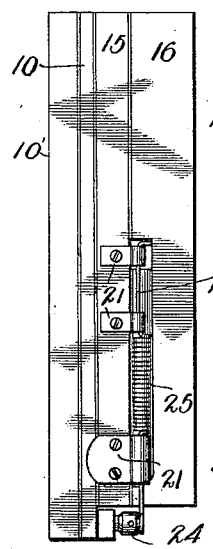

W. F. COOPER.
MOTOR REGULATOR.
APPLICATION FILED AUG. 12, 1912.

1,134,821. Patented Apr. 6, 1915.

Witnesses.
Jo. F. Collins,
M. E. Lowry.

Inventor.
William F. Cooper
By H. E. Everts Co.
Attorneys

UNITED STATES PATENT OFFICE.

WILLIAM F. COOPER, OF NORWALK, OHIO.

MOTOR-REGULATOR.

1,134,821.

Specification of Letters Patent.

Patented Apr. 6, 1915.

Application filed August 12, 1912. Serial No. 714,606.

*To all whom it may concern:*

Be it known that I, WILLIAM F. COOPER, a citizen of the United States, and residing at Norwalk, in the county of Huron and State of Ohio, have invented certain new and useful Improvements in Motor-Regulators, of which the following is a specification.

This invention relates to certain new and useful improvements in motor regulators, and particularly to such regulators as are employed in connection with pneumatic player piano mechanisms, for controlling the pressure of air which is drawn through the motor.

The main object of the invention is to provide a motor regulator with means to balance the regulator valve whereby to obviate fluctuations in the pressure under the diaphragm of the regulator, thereby enabling the speed of a pneumatic motor connected with the regulator to be increased or decreased, without being affected by fluctuations in pressure of the main bellows of the player mechanism.

It may be here stated that motor regulators of the type to which this invention pertains are employed in pneumatically operated player mechanisms, between the bellows and the motor of such mechanism to supply a constant pressure of air, such pressure being practically as low as the least amount that would be supplied by regular operation of the pedals of the player mechanism. The motor regulator acts as a shut-off for any higher pressure to the motor, and with the aid of means generally used to regulate the desired quantity of wind, enables the operator to increase or decrease the speed of the motor without having it affected by fluctuations in pressure of the bellows forming a part of the player mechanism. Such regulators generally employ a motor regulator diaphragm, which operates upon the motor regulator valve, and the pressure which operates under said valve will produce a varying amount of suction on the valve and thereby cause fluctuations in the pressure, such fluctuations being caused by the spring that operates upon the diaphragm.

My invention aims to wholly and effectually overcome these fluctuations, whether the motor regulator employed be of the vacuum pressure regulator type, or of a plus pressure regulator type, but for the purpose of illustration, I have selected a motor regulator of the vacuum pressure type, and will hereinafter specifically describe the same, without however, intending thereby to limit the invention to motors of this specific type, since obviously, the principle involved is adapted for application to pressure regulators of the plus pressure type.

Figure 4:
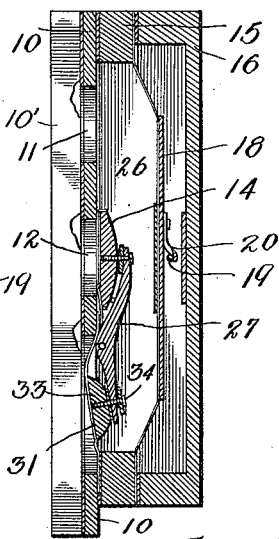
Figure 1:
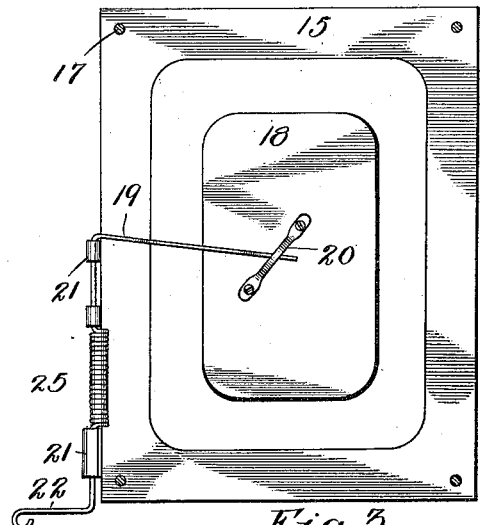
Figure 2:
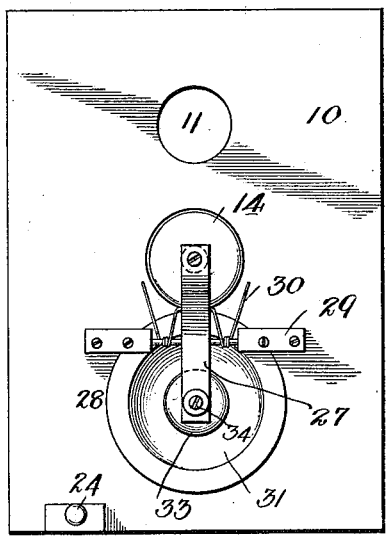
Figure 3:
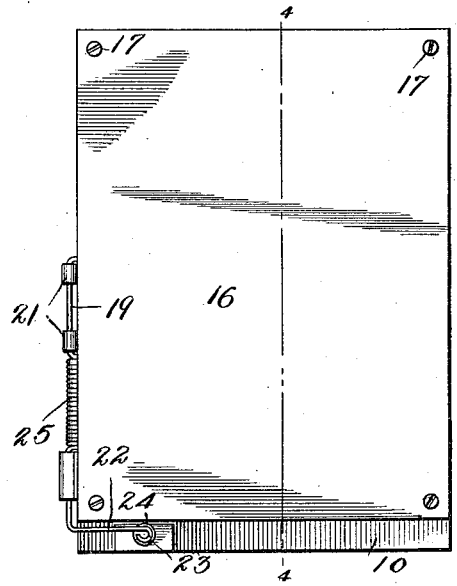

In describing the invention in detail, reference will be had to the accompanying drawings forming a part of this specification, and wherein like numerals of reference will be employed to designate like parts throughout the different views, in which:

Figure 1 is a plan view of a motor controller in accordance with this invention. Fig. 2 is a plan view of the base of the motor regulator box or case showing the motor regulator valve and an embodiment of a motor regulator valve balancing means in accordance with this invention. Fig. 3 is also a plan view of the motor regulator with the face plate or cover thereof removed, showing the motor regulator diaphragm and its spring. Fig. 4 is a transverse vertical sectional view through the motor regulator taken on the line 4—4 of Fig. 1, and Fig. 5 is an edge or side view of the motor regulator.

It is believed to be unnecessary to herein illustrate or describe in detail any of the appurtenant parts of a player mechanism with which motor regulators of the type herein shown are associated, it being well understood by those skilled in the art that in connection with pneumatically - operated player mechanisms, the air is drawn into the main bellows from a motor, the air first passing into the motor and then through a controller box or other device which regulates the quantity of air, and then to the motor regulator on the under side of the regulator diaphragm of the latter and passes from under said diaphragm through a port controlled by the motor regulator valve, from whence it is conducted to the bellows and passes out through the feeders or pumps.

To accomplish the objects of my invention therefore, I provide a box embodying a base 10 provided with an inlet port 11 and an outlet port 12 preferably, though not necessarily, placed in alinement with each other in the base as shown, the passage of the air through the outlet port 12 being controlled by the motor regulator valve 14. The base 10 in practice is attached to the usual channel board 10′ of the player action. Mounted on the base 10 is a frame 15, and superposed on the frame 15 is a cover plate 16, the parts being all firmly secured together as by screws 17.

The frame 15 carries the motor regulator diaphragm 18, acted upon by a spring 19, herein shown as being formed from a single piece of spring wire having its one end engaged under a clip 20 carried by the diaphragm 18, with the shank of the spring held in keepers 21 carried by one side edge of the frame, and the other end of the spring bent laterally to form an arm 22 which has an eye or loop 23 on its free end to lie upon a capstan screw 24 carried by the base 10 adjacent one end of the latter, and the spring provided intermediate the ends of its shank with a coil 25. Obviously, with such construction of spring, the turning outward or inward of the capstan screw 24 will increase or decrease the tension of the spring upon the diaphragm 18.

The vacuum pressure admitted to chamber 26 between the diaphragm and the base 10 causes said diaphragm to bear more or less, according to the pressure, upon the valve 14 and thus regulate the pressure of air passing through outlet 12. The valve 14 is carried at one end of a lever 27, trunnioned intermediate its ends on a pin 28 received in journal bearings 29 carried by the base 10. This lever is acted upon by a spring 30 exerting its tension to normally hold the valve 14 unseated.

Obviously, with the construction as so far described, it will be evident that the higher the suction under the valve 14, the greater will be the pull on the diaphragm spring 19 with a resultant decrease in the pressure above, and a consequent fluctuation in the pressure due to the spring operating on the diaphragm. To counteract this, I provide a valve balancing means, the embodiment herein shown consisting of a diaphragm 31 secured to the inner face of the base plate 10 over an opening 32, and suitably connected to the opposite end of the lever 27, as by providing the diaphragm with a button 33 rigidly secured to the center of the diaphragm and fastened to the lever 27 by a screw 34 which passes through a slot provided therefor in said lever near its free end. The spring 30 therefore acts upon the diaphragm 31 as well as upon the motor regulator valve 14, and said spring being so arranged as to normally lift the valve 14, it consequently acts to bear down upon the diaphragm 31.

It will be understood of course that the under side of the balancing diaphragm 31 is connected directly with the suction pressure operating upon the under side of the motor regulator valve, and hence the pressure upon this diaphragm is, through its direct connection with the motor regulator valve, transmitted to the valve and keeps the latter balanced at all times irrespective of the varying amount of suction on the valve and fluctuations in the pressure due to the spring operating upon the motor regulator diaphragm.

I desire to be understood herein as claiming broadly the employment of a balancing means for the motor regulator valve, and therefore do not desire to limit myself to the employment of a balancing diaphragm such as herein shown and described, since obviously, other means than that herein shown and described in detail could be provided to exert a pull on the valve in the same manner as is accomplished by the diaphragm shown and described.

What I claim as new and desire to secure by Letters Patent of the United States is:—

1. In a motor regulator, a cover plate, a base carried by the cover plate and provided with inlet and outlet ports, a motor regulator diaphragm arranged within the cover plate, a motor regulator valve acted upon but movable independently of the diaphragm, means for varying the resistance to operation of the diaphragm, means for normally holding the controlling valve in an open position, and a pressure controlled balancing means for the valve acting thereon independently of the motor regulating means.

2. In a motor regulator, a cover plate, a base provided with inlet and outlet ports, a pivotally-mounted motor regulating valve; a motor regulator diaphragm arranged within the cover plate to act upon but free from connection with and movable independently of the valve, means for varying the resistance to operation of the diaphragm, means for normally holding the controlling valve in an open position, and a pressure-controlled valve balancing means acting on the valve independently of the motor regulating diaphragm.

3. In a motor regulator, a motor regulator diaphragm, means for varying the resistance to operation of the diaphragm, a valve independently movable of and adapted to be acted upon by the diaphragm for controlling the pressure of air passing through the regulator, means for normally holding the controlling valve in an open position, and pressure-controlled means acting on the valve to balance the same against fluctuations of pressure thereon.

4. In a motor regulator, a motor regulator diaphragm, means for varying resistance to operation of the diaphragm, a valve independently movable of and arranged to be acted upon by the diaphragm for controlling the pressure of air through the regulator, means for normally holding the controlling valve in an open position, and a pressure controlled diaphragm acting on the valve to balance the same against fluctuations of pressure thereon.

5. In a motor regulator, a motor regulator diaphragm, means for varying the resistance to operation of the diaphragm, a valve independently movable of and adapted to be acted upon by the diaphragm for controlling the pressure of air passing through the regulator, a pressure-controlled balancing means for the valve, means for normally holding the controlling valve in an open position, and means for admitting the same pressure to the valve and the valve-balancing means.

In testimony whereof I affix my signature in presence of two witnesses.

WILLIAM F. COOPER.

Witnesses:
 E. O. BOUGHTON,
 BORS B. DICKAW.

Copies of this patent may be obtained for five cents each, by addressing the "Commissioner of Patents, Washington, D. C."